United States Patent [19]

Berkcan

[11] Patent Number: 5,401,958
[45] Date of Patent: Mar. 28, 1995

[54] OPTICAL TEMPERATURE COMPENSATION OF SPECTRAL MODULATION SENSORS BY SPECTROGRAPHIC INTERROGATION HAVING A DISPERSIVE ELEMENT

[75] Inventor: Ertugrul Berkcan, Niskayuna, N.Y.

[73] Assignee: General Electric Company, Schenectady, N.Y.

[21] Appl. No.: 118,361

[22] Filed: Sep. 8, 1993

[51] Int. Cl.⁶ .............................................. H01J 5/16
[52] U.S. Cl. ............................ 250/227.23; 250/226
[58] Field of Search ...................... 250/227.23, 227.18, 250/226, 227.21, 227.14, 227.19; 73/802, 804–806; 356/352, 345, 350

[56] References Cited

U.S. PATENT DOCUMENTS

| | | | |
|---|---|---|---|
| 4,800,266 | 1/1989 | Poorman | 250/227.23 |
| 4,945,230 | 7/1990 | Saaski et al. | |
| 5,212,392 | 5/1993 | Berkcan et al. | |
| 5,276,501 | 1/1994 | McClintock et al. | 250/227.19 |

OTHER PUBLICATIONS

"A Fiber Optic Sensing System Based on Spectral Modulation", by E. W. Saaski et al., Advances in Instrumentation, vol. 41, Part 3, pp. 1177–1184, Instrument Society of America, Jul. 1986.
"Multimode Fiber Optic Pressure Sensor With Extended Range", by E. W. Saaski et al., SPIE vol. 838, Fiber Optic and Laser Sensor V, pp. 46–48, Jan. 1987.
"Fiber Optic Temperature Sensor Using Spectral Modulation", by J. C. Hartl et al., SPIE, vol. 838, Fiber Optic and Laser Sensors V, pp. 257–261, Jan. 1987.
"Spectrum-Modulating Fiber-Optic Sensors for Aircraft Control Systems", by Glen Beheim et al., 1st International Military and Government Fiber-Optic and Communications Exposition, Washington, D.C., Mar. 1987, pp. 1–8.
"Silicon-Etalon Fiber-Optic Temperature Sensor", Glen Beheim et al., SPIE vol. 1169, Fiber and Optic Laser Sensors VII, pp. 504–511, Jan. 1989.
"Differential Absorption Sensors: The Elimination of LED Temperature and Ageing Effects", by E. Theocharous, SPIE. vol. 798, Fiber Optic Sensors II, pp. 253–256, Jan. 1987.

Primary Examiner—David C. Nelms
Assistant Examiner—Que T. Te
Attorney, Agent, or Firm—Ann M. Kratz; Marvin Snyder

[57] ABSTRACT

An optical temperature compensation system for spectral modulation sensors includes a light director for receiving excitation light, a spectral modulation sensor for receiving and modulating a first portion of the excitation light from the light director, and an optical processing component for receiving and determining properties of a second portion of the excitation light from the light director and the modulated first portion of the excitation light. The optical processing component comprises a dispersive element for dispersing the second portion of the excitation light and the modulated first portion of the excitation light and a charge transfer device for converting the dispersed portions of light into electrical signals. A digital signal processor calculates a detected ratio of the electrical signals which compensates for inaccuracies in measurement due to source temperature variations.

19 Claims, 8 Drawing Sheets

OPTICAL TEMPERATURE COMPENSATION OF SPECTRAL MODULATION SENSORS BY SPECTROGRAPHIC INTERROGATION HAVING A DISPERSIVE ELEMENT

CROSS-REFERENCE TO RELATED APPLICATION

This application is related to the following co-pending application which is commonly assigned and is incorporated herein by reference: Berkcan, "Optical Temperature Compensation of Spectral Modulation Sensors by Ratiometric Interrogation", Ser. No. 08/118,467, (attorney's docket number, RD-21,991), filed concurrently herewith.

BACKGROUND OF THE INVENTION

1. Field of the Invention

This invention relates generally to optical temperature compensation of spectral modulation sensors, and, more particularly, to spectrographic interrogation of spectral modulation sensors.

2. Description of the Related Art

In advanced aircraft applications, the use of fiber optic sensors to carry information between sensors and control modules provides immunity from contamination by electromagnetic sources, reduces volume and weight by eliminating the need for electromagnetic shielding, and further reduces weight by replacing metal conductors with low weight optical fibers. Advantages afforded by spectral modulation based fiber optic sensors include polarization independence, ease of multiplexing sensors with a common electro-optical interface, and reduced sensitivity to variations of link losses.

The sensitivity of these sensors to source temperature, however, severely limits their usefulness for aircraft engine or airframe applications. Typically, light emitting diodes (LEDs) are used for interrogating the sensors. The source temperature drift is critical in view of the high temperatures and acute temperature changes that occur in aircraft engines. The process of using thermo-electric coolers for controlling the source temperature is slow and breaks down at high temperatures due to the diffusion of carriers and electro-migration in the thermo-electric element.

To avoid measurement inaccuracies resulting from changes in light source intensity and changes in light transmission intensity due to bending of the optical fibers or optical connector loss, Saaski et al., U.S. Pat. No. 4,945,230, issued Jul. 31, 1990, describes a technique using ratiometric measurement with spectral modulation sensors. In the Saaski device the physical parameter being measured causes changes in the reflectivity and transmission of the sensor's optically resonant structure and thus spectrally modulates the output light from the sensor as a function of the physical parameter being measured. The spectrally modulated output light is converted into an output electrical signal by detection means. In one embodiment the detection means splits the spectrally modulated light into two spectral components, each of which is separately converted into an electrical signal by a photodetector means. A divider circuit then takes the detector ratio of these two electrical signals to provide an output signal. The Saaski device, however, does not avoid inaccuracies due to source temperature.

Aforementioned co-pending Berkcan, Ser. No. 08/118,467 (attorney's docket number RD-21,991), discloses a device employing a source monitoring component which receives light from the source, compensates the light, and then splits the compensated light into two spectral components which are converted into electrical signals by photodetectors. A source ratio including the excitation light converted into the electrical signals is taken in addition to taking a detector ratio including two components of spectrally modulated light converted into electrical signals. The source and detector ratios are multiplied to determine a detected ratio which can be used with a calibration curve to compensate for inaccuracies in measurement due to source temperature variations.

It would be desirable to have a detection system in which the source light can be sent to an optical processing component in an unmodified form and yield measurements of increased precision.

SUMMARY OF THE INVENTION

Accordingly, one object of the present invention is to increase the source temperature robustness and decrease the temperature coefficient of sensitivity for a spectral modulation sensor.

Briefly, in accordance with a preferred embodiment of the invention, an optical temperature compensation system for spectral modulation sensors comprises a light director for receiving excitation light, a spectral modulation sensor for receiving and modulating a first portion of the excitation light from the light director, and an optical processing component for receiving and determining properties of a second portion of the excitation light from the light director and the modulated first portion of the excitation light. The optical processing component comprises a dispersive element for dispersing the second portion of the excitation light and the modulated first portion of the excitation light and a charge transfer device for converting the dispersed portions of light into electrical signals.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF PREFERRED EMBODIMENTS OF THE INVENTION

Figure 1:
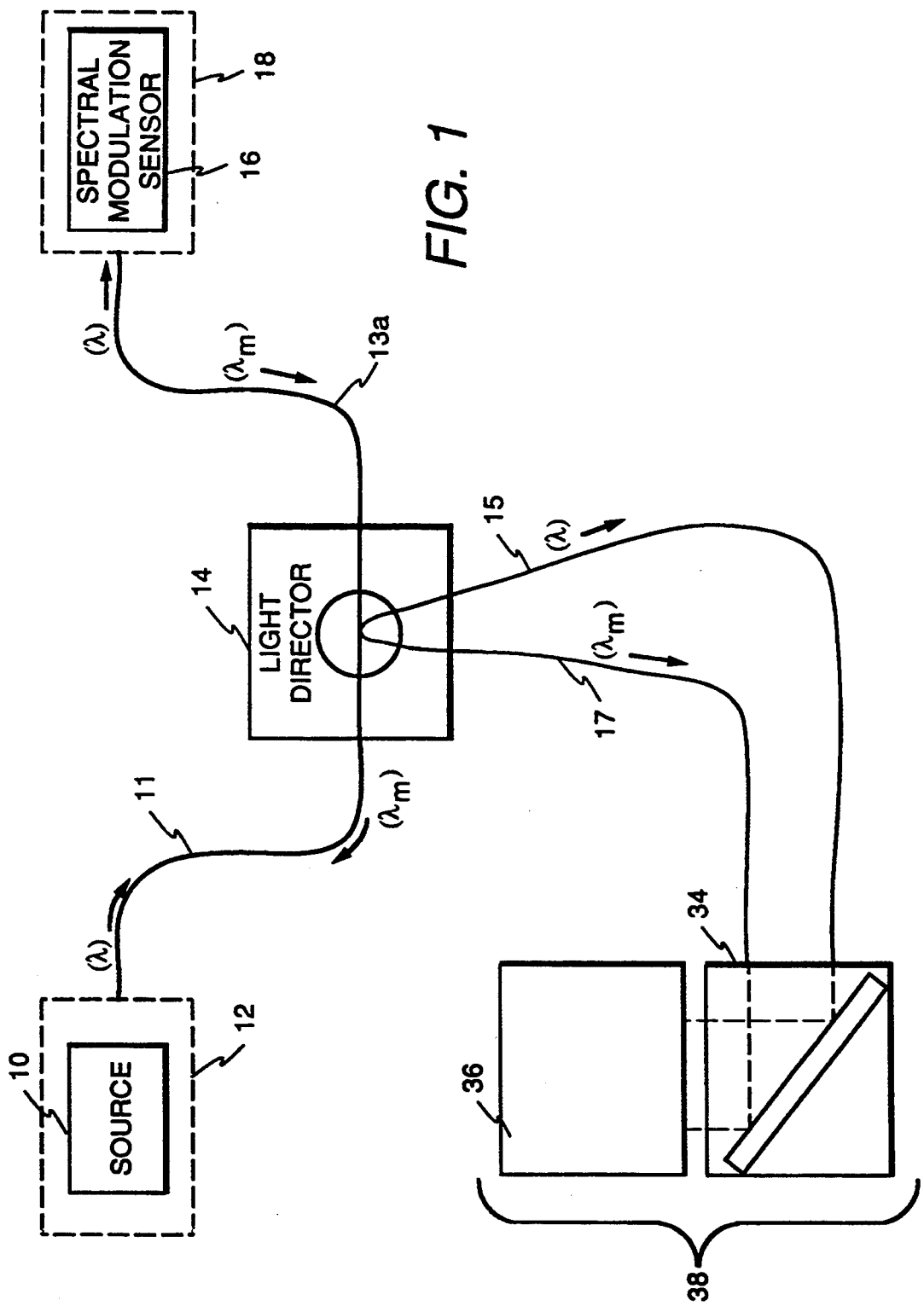
FIG. 1 is a schematic diagram of one embodiment of the invention employing a reflective spectral modulation sensor.

FIG. 1 is a schematic diagram of one embodiment of the invention in which a reflective sensor 16 is used. A light source 10 is typically a light emitting diode (LED). Light source 10 can be surrounded by a thermo-electric cooler or temperature controller 12, such as supplied by Melles Griot, Inc., of Irvine, Calif. Throughout the drawings, unless otherwise indicated, solid lines are intended to represent fibers or electrical wires whereas dashed lines are intended to represent light which has emerged from a fiber or other optical component. Micro-optics and fiber optic manipulators, which are typically used for purposes such as coupling the light from the source into an optical fiber 11 or directing light from a fiber into another fiber or optical component, are not shown in the drawings. Micro-optics and fiber optic manipulators, as wells as temperature controllers, can be used for characterizing the system.

The light ($\lambda$) from source 10 travels through fiber 11 to a light director 14 which can comprise a directional coupler, such as supplied by Canstar, a division of Canada Wire and Cable Ltd. in Westboro, Mass. Light director 14 splits the excitation light from source 10 into two portions.

One of the two portions of excitation light enters a spectral modulation fiber optic sensor 16 through an optical fiber branch 13a. Sensor 16 can be surrounded by a thermo-electric cooler 18 to allow accurate calibration of the sensor. The sensor, which can be a reflective spectral modulation sensor such as supplied by Metricor, Inc., of Woodinville, Wash., can be designed to detect any one of a number of parameters including temperature, pressure, position, flow, speed, vibration, and acceleration. The light ($\lambda_m$) modulated by this sensor is coupled back into light director 14 along fiber 13a towards an optical processing component 38 along a fiber branch 17. The other of the two portions of excitation light emanating from light director 14 enters optical processing component 38 through a fiber branch 15. Optical processing component 38 includes a dispersive element 34 as well as a two-dimensional detector system 36. Dispersive element 34 can comprise any means for dispersing light including, for example, a grating, prism, wavelength division multiplexer, common path interferometer, or a spectrometer, such as a Fourier transform spectrometer.

Figure 2:
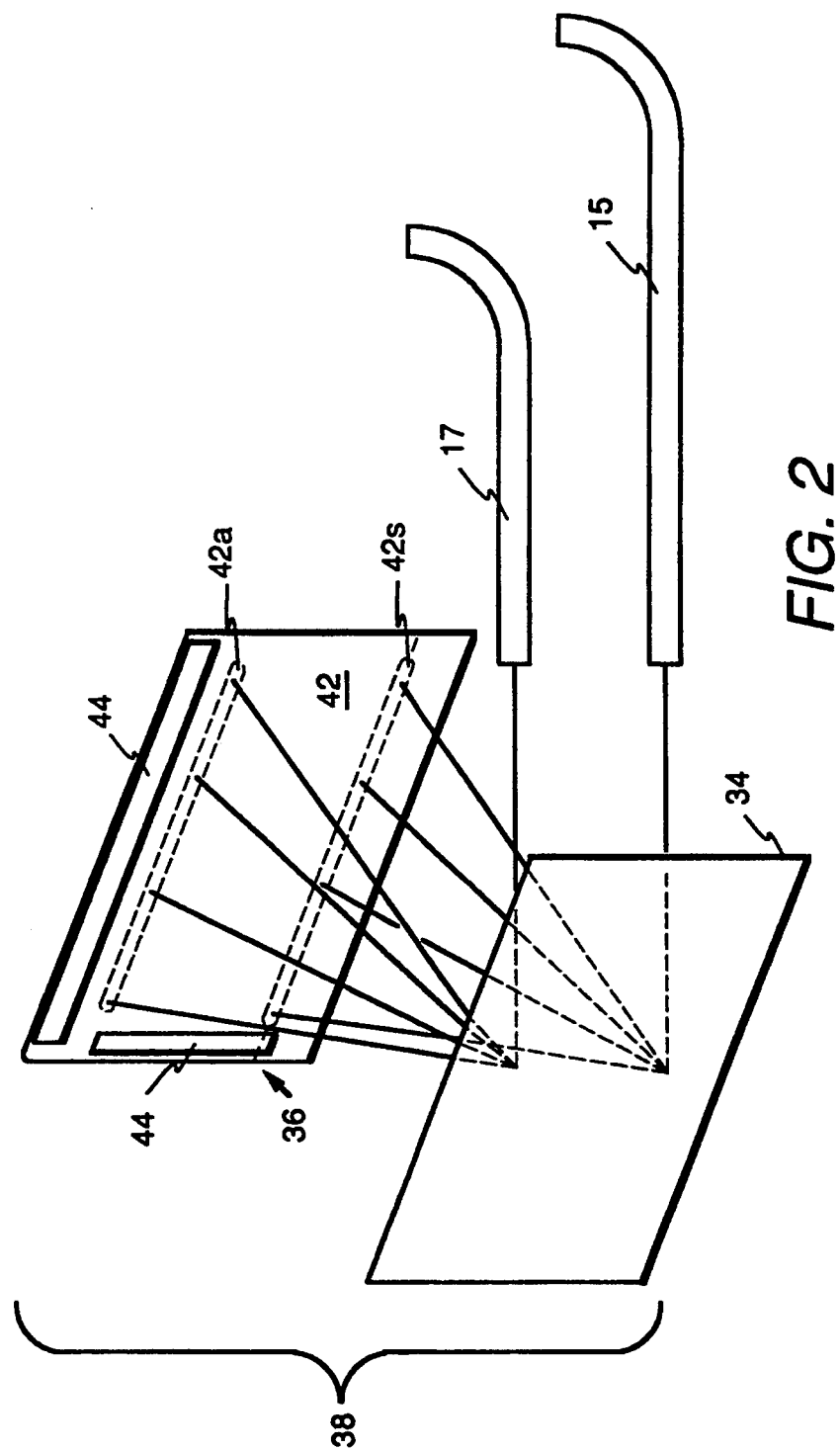
FIG. 2 is a schematic diagram of an optical processing component usable in the invention.
Figure 3:
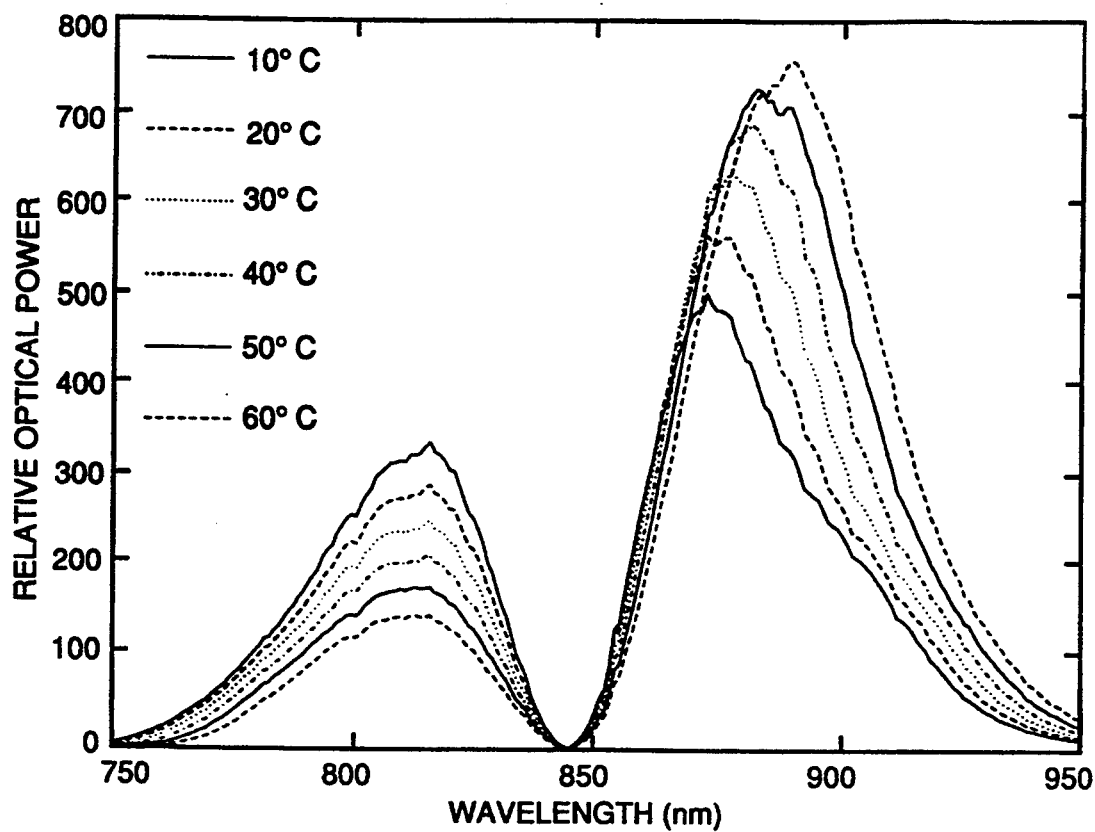
FIG. 3 is a graph illustrating a sensor response versus wavelength curve.

As shown in the embodiment of FIG. 2, detector system 36 comprises a charge transfer device 42 with scanning means, shown as row and column scanners 44. In FIG. 2, the light emerging from fibers 17 and 15 is represented by solid lines and the light which would not be visible through dispersive element 34 is represented by dashed lines.

Charge transfer device 42 may comprise charge injection devices (CIDs), such as GE CID 388 and CID Technologies Inc. Model 2710, or charge coupled devices (CCDs), for example. Although two rows, row 42a and row 42s, are shown in FIG. 2, any number of rows can be used, as further discussed with respect the embodiment of FIG. 7. Alternatively, charge transfer device 42 may comprise a plurality of discrete charge transfer devices $42_a, 42_b, \ldots, 42_n, 42_s$, as shown in the embodiments of FIGS. 8–9.

CIDs are preferred for charge transfer device 42 because CIDs have the capability to produce an output representation of the charge from different elements within a given row or column at high speed and to do so repeatedly without having to reilluminate the detector. The choice of scanners 44 depends on the type of charge transfer device 42. When the charge transfer device is a CID, scanners 44 preferably comprise shift registers.

The non-destructive readout and the random access capabilities of the CIDs are used in the following manner. The sum of the charges from a set of N pixels is read by activating a respective row and column for each respective pixel simultaneously; the spectra are thus read in bins as a result of the sum of the readings from N pixels out of the total number $N_t$ of pixels. This results in performing $m = N_t/N$ readings. In one embodiment, the detected ratio p is then calculated using the equation:

$$\rho = \sum_{j=1}^{m} (V_j\text{sensor}/V_j\text{source}).$$

in which $V_j^{sensor}$ represents the signal corresponding to the reading for the sensor and $V_j^{source}$ represents the signal corresponding to the readings for the source. A calibration curve (not shown) can be determined by plotting a graph of $\rho$ versus the parameter to be measured. Data points on the calibration curve are obtained by supplying either known values of the parameter to be measured or physical properties and measuring respective $\rho$ for each such parameter or physical property. After sufficient data points have been obtained, a curve can be interpolated. When the curve is graphed, an unknown parameter can be determined by measuring $\pi$ and finding the corresponding parameter value as indicated on the calibration curve.

Charge injection devices can be used to read the value of the charge repeatedly and non-destructively. This capability of non-destructive multiple read-out can be used to reduce the fixed pattern noise by carrying out a double read as follows. Two sets of samples are taken for each reading; since the fixed pattern noise does not change between these samples, the first sample is subtracted from the second to reduce the fixed pattern noise. The same capability is used to reduce the temporal readout noise by taking and averaging many samples for each of the first and second readings. It should be noted that the the resolution and fundamental accuracy of this measurement is ultimately limited by the photon shot noise in the device.

To measure the effect of source temperature on sensor response, each of sensors 16 used was a commercially available reflective spectral modulation fiber optic temperature and pressure sensor. An LED supplied by Honeywell, Inc., of Richardson, Tex., was used as light source 10. The output spectrum of the LED shifted towards longer wavelengths as the temperature of the source was increased. The temperature of the source was varied in the range of 10° C. to 60° C. in 10° C. increments. The average value for the shift of the center of the full width at half the maximum of the spectral distribution was 0.32 nm/° C., and the total power emitted decreased by as much as 0.3%/° C. FIG.

3 is a sensor response versus wavelength curve for each of the source temperatures employed.

Figure 4:
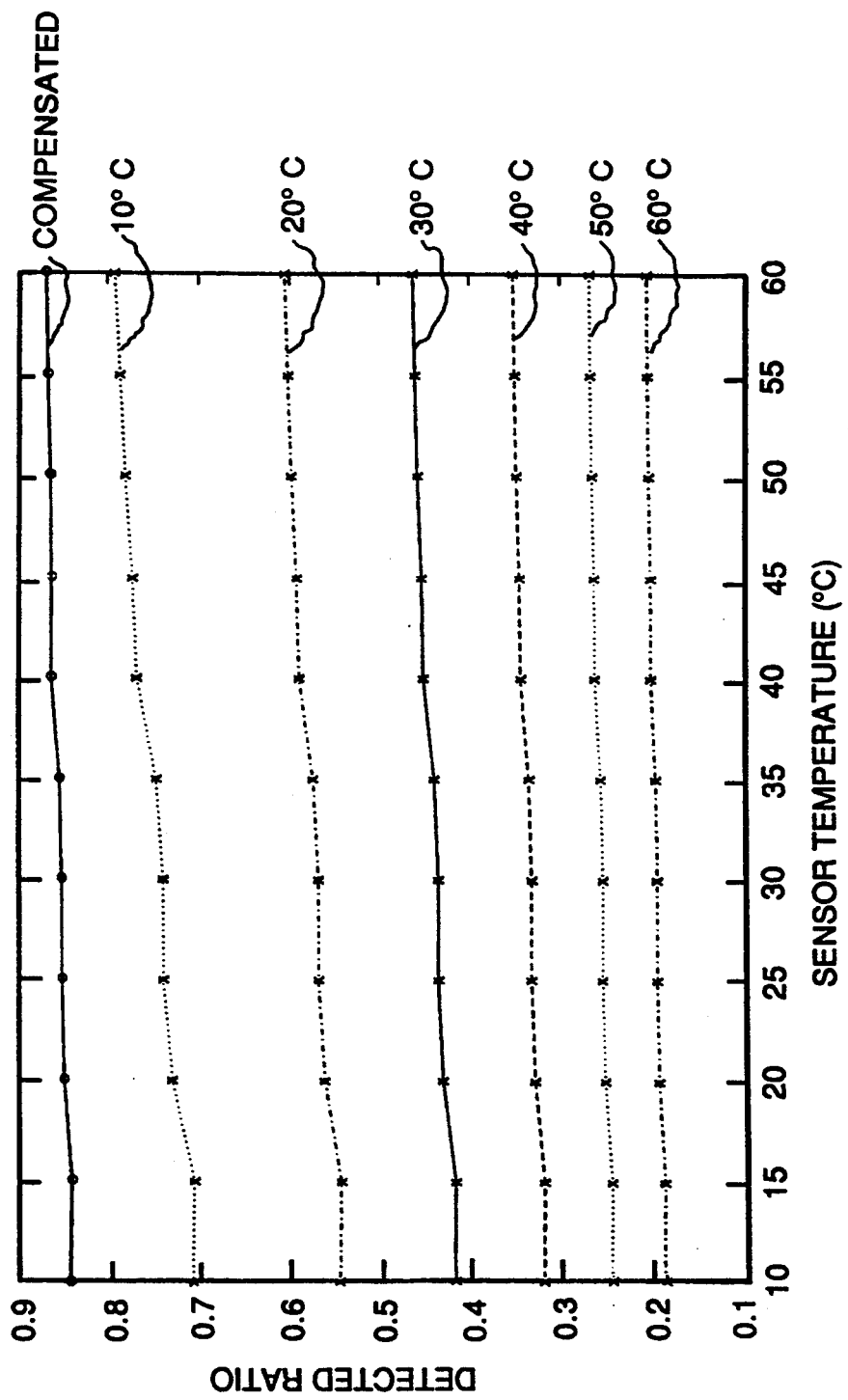
FIG. 4 is a graphical comparison of the deviation of an optically compensated optical detection system with an optically uncompensated system.
Figure 5:
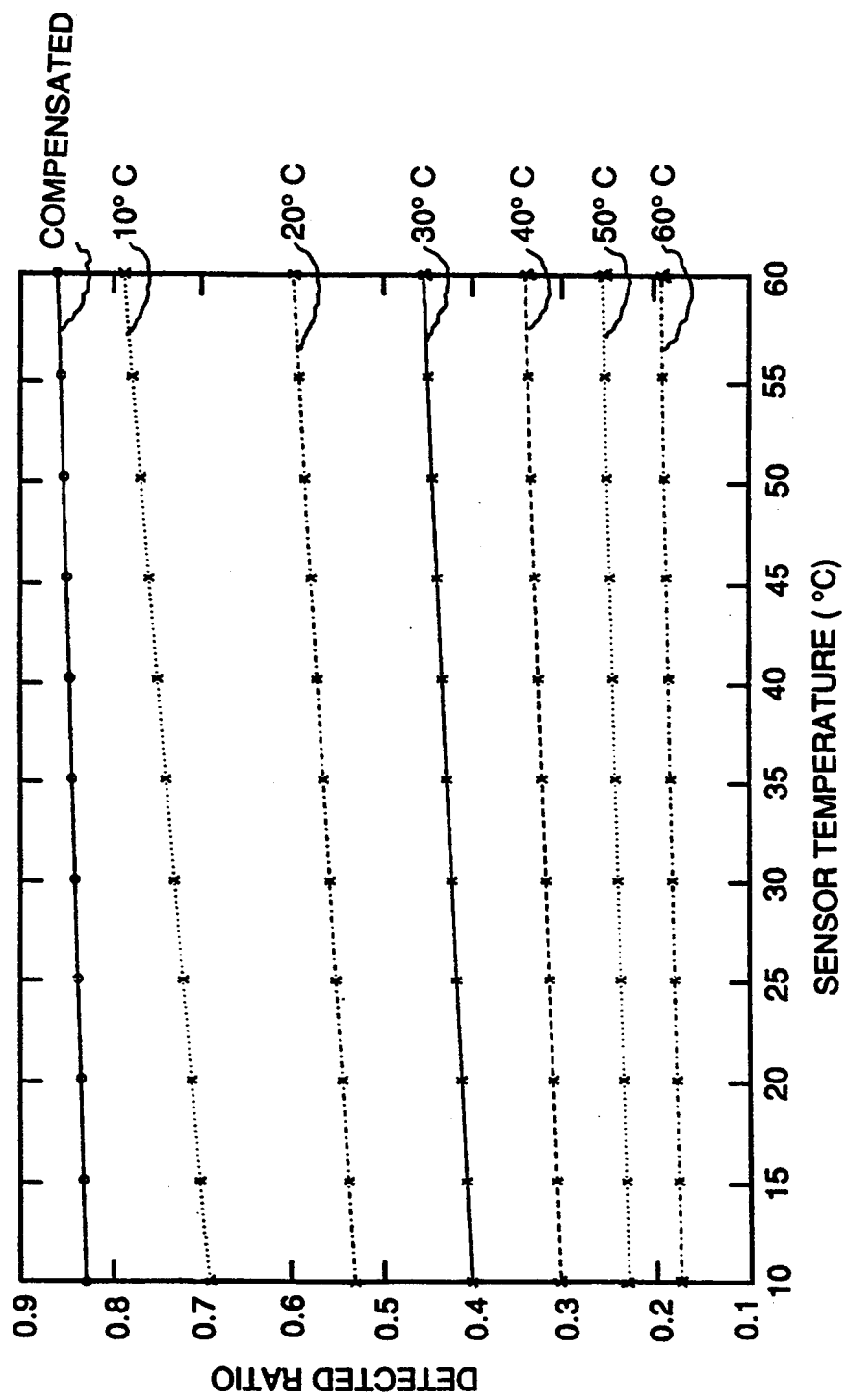
FIG. 5 is a graphical illustration of data of FIG. 4 with the respective calibration fits.

FIG. 4 illustrates the a computer simulated graph of the detected ratio of an optically compensated detection system (o) in comparison with that of an uncompensated system (x). FIG. 5 illustrates data of FIG. 4 shown with the respective calibration fits. In this case the calibration fits are linearized curves formed mathematically and numerically by applying least square optimization formulas to the sets of data points.

Figure 6:
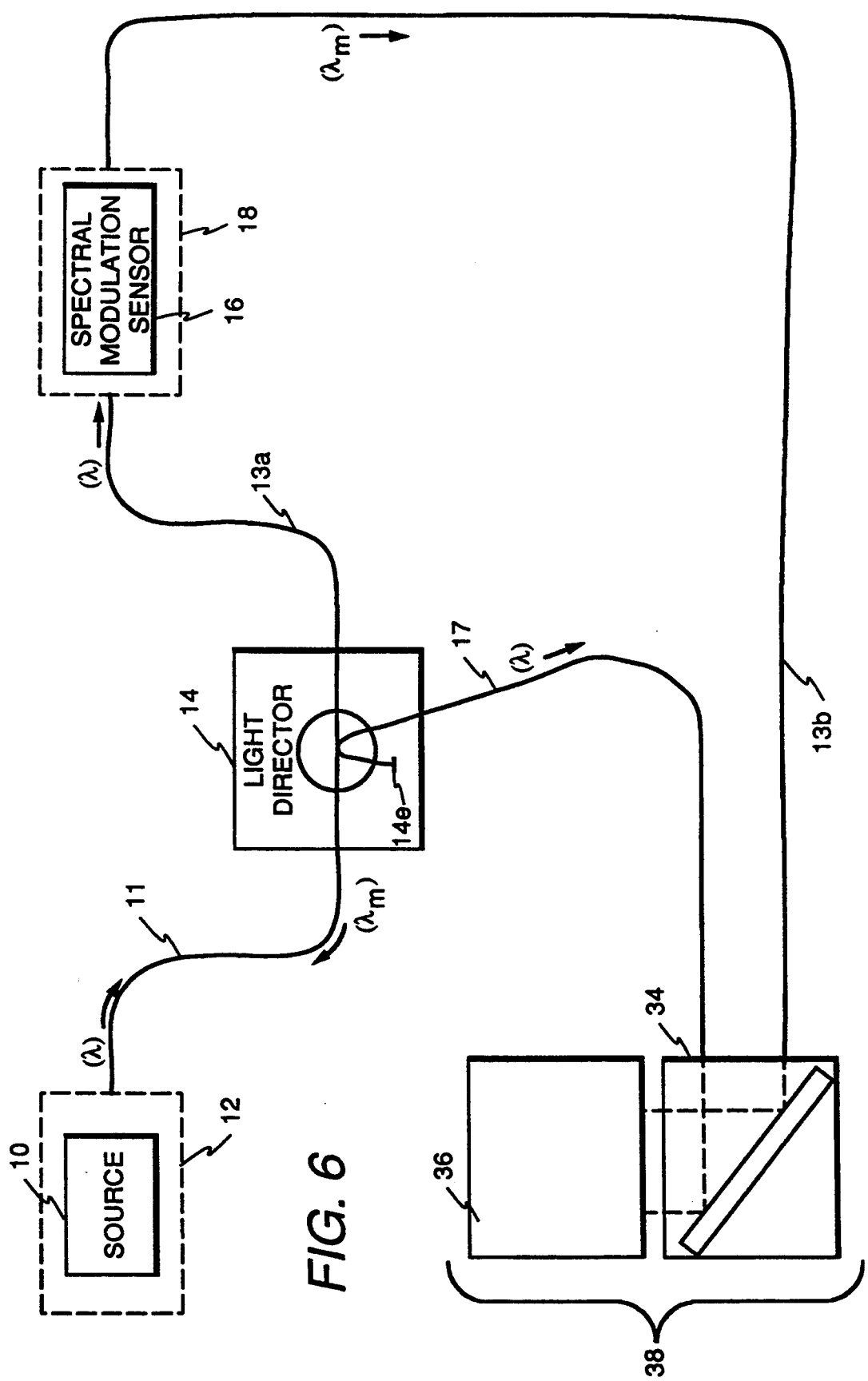
FIG. 6 is a schematic diagram of one embodiment of the invention employing a transmissive spectral modulation sensor.

FIG. 6 is a schematic diagram of one embodiment of the invention employing a transmissive spectral modulation sensor. Sensor 16 can be a transmissive spectral modulation sensor such as supplied by Metricor, Inc. This embodiment differs from that of FIG. 1 in that the modulated light travels through fiber 13b to optical processing component 38 rather than back through fiber 13a and light director 14, as shown in FIG. 1. If a directional coupler is used for light director 14, the end 14e is preferably either crushed or coated with an index matching gel, for example, so that no light is reflected from end 14e.

Figure 7:
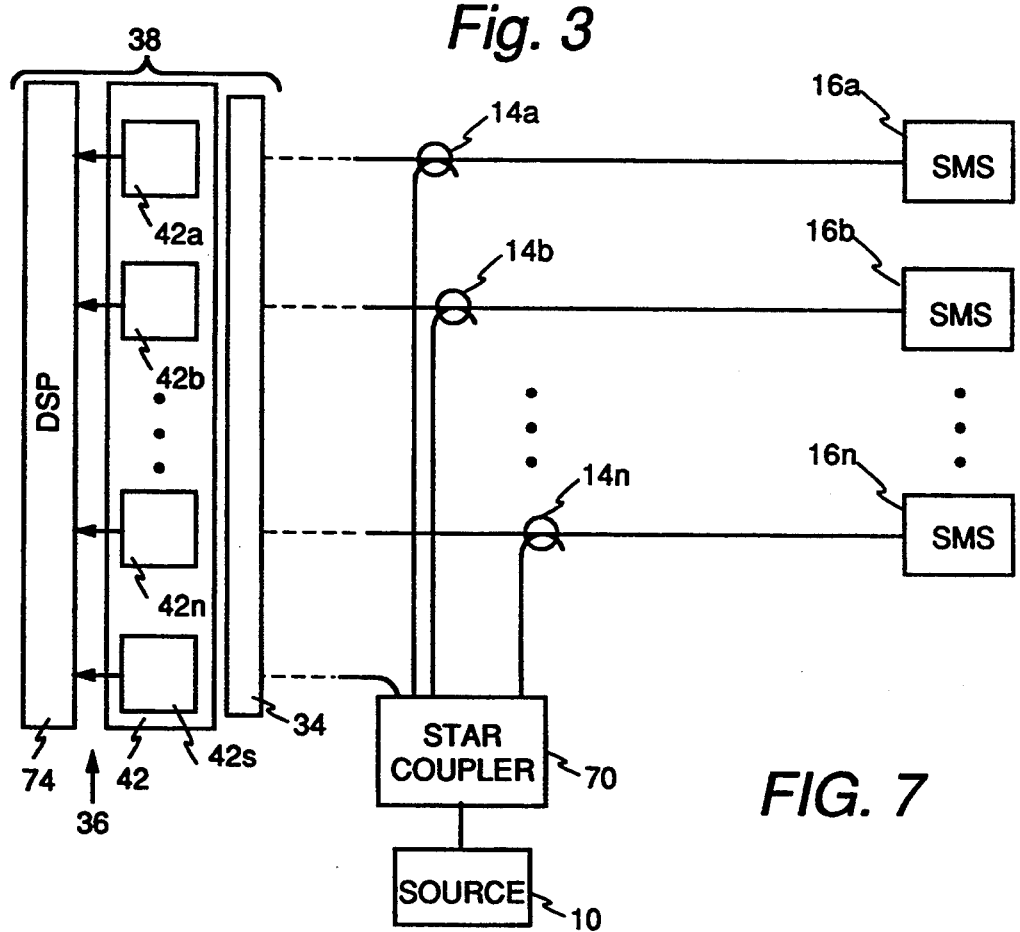
FIG. 7 is a schematic diagram of one embodiment of the invention employing multiplexed spectral modulation sensors.
Figure 8:
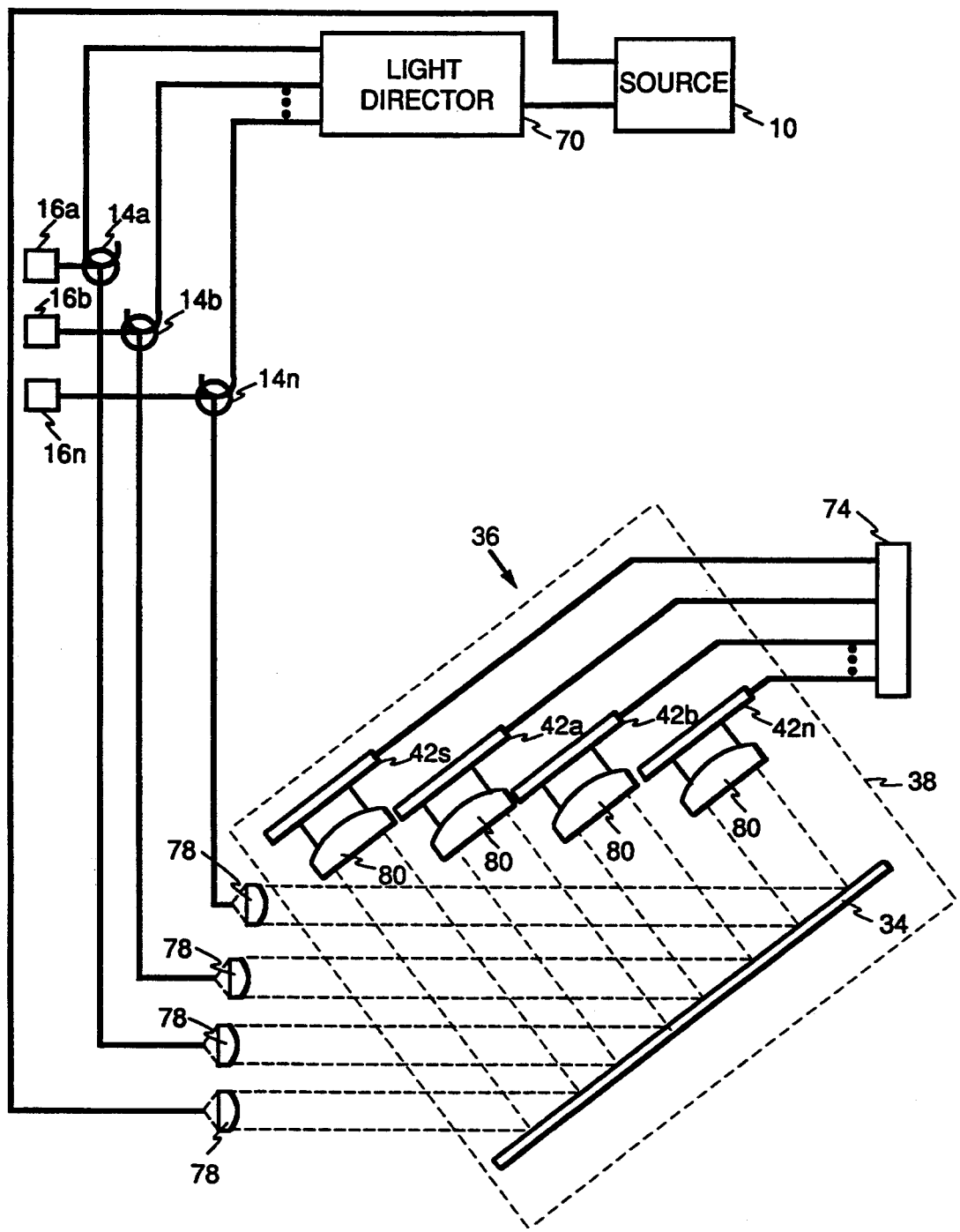
FIG. 8 is a schematic diagram of another embodiment of the invention employing multiplexed spectral modulation sensors.
Figure 9:
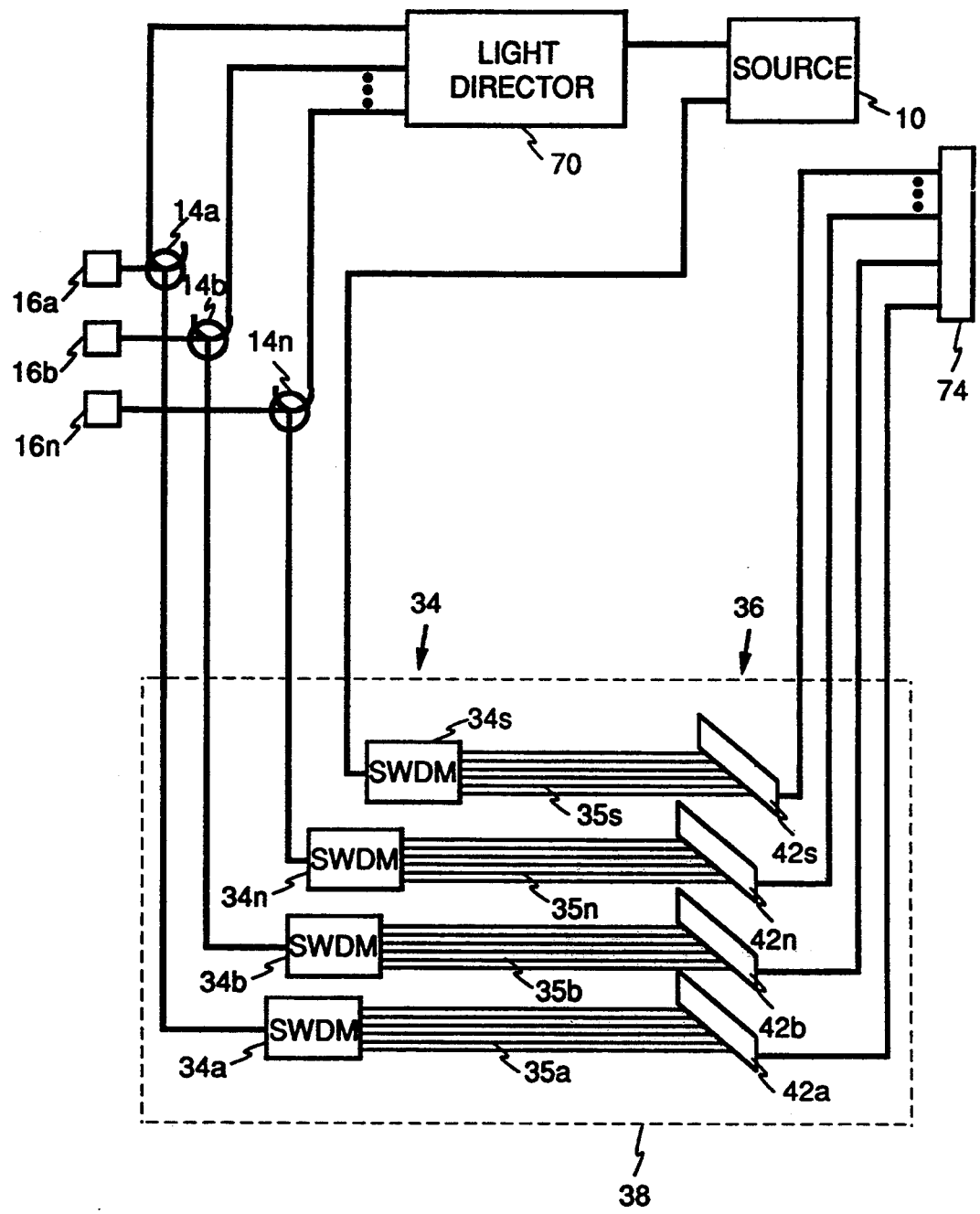
FIG. 9 is a schematic diagram of still another embodiment of the invention employing multiplexed spectral modulation sensors.

FIGS. 7-9 are schematic diagrams of several exemplary embodiments for multiplexing sensors in the present invention. Although the embodiments of FIGS. 7-9 are illustrated using reflective spectral modulation sensors $16_a$, $16_b$, ..., $16_n$, they are equally applicable for use with transmissive sensors with minor modifications which will be described below. In each case, light source 10 and optical processing component 38 are similar to those discussed with respect to the embodiment of FIG. 1. The aspects which differ are the methods of coupling the sensors to the source and optical processing component.

One technique for multiplexing sensors is shown in the embodiment of FIG. 7. Light source 10 supplies light to a light director 70 which can either comprise a star coupler or a directional switcher, and is shown as a star coupler, which is available from Canstar of Westboro, Mass. The star coupler delivers portions of the light to each of n spectral modulation sensors $16_a$, $16_b$, ..., $16_n$. In this embodiment, charge transfer device 42 comprises an array having n+1 rows $42_a$, $42_b$, ..., $42_n$, $42_s$. A respective light director, such as a directional coupler $14_a$, $14_b$, ..., $14_n$, is present between the star coupler and each respective spectral modulation sensor $16_a$, $16_b$, ..., $16_n$. The sensors are coupled through the directional couplers to predesignated portions of dispersive element 34 which directs light from directional couplers $14_a$, $14_b$, ..., $14_n$ to predetermined respective rows $42_a$, $42_b$, ..., $42_n$. The star coupler couples a portion of the source light into row $42_s$ of charge transfer device 42. After the light signals are converted into electrical signals by charge transfer device 42, these electrical signals can be sent to signal conditioning electronics, such as digital signal processor (DSP) 74, for calculation of detected ratio $\rho$.

FIG. 8 is a schematic diagram of another embodiment of the invention employing multiplexed sensors and differs from the embodiment of FIG. 7 in that detector system 36 includes discrete charge transfer devices $42_a$, $42_b$, ..., $42_n$, $42_s$, rather than a single array. Positioning optics, shown as lenses 78 and 80, are useful to direct light to dispersive element 34 and from the dispersive element to the charge transfer devices.

FIG. 9 is a schematic diagram of still another embodiment of the invention employing multiplexed sensors. The embodiment of FIG. 9 represents a system in which dispersive element 34 comprises a plurality of wavelength division multiplexers $34_a$, $34_b$, ..., $34_n$, $34_s$ which send predetermined wavelengths through respective fiber bundles $35_a$, $35_b$, ..., $35_n$, $35_s$ to respective charge transfer devices $42_a$, $42_b$, ..., $42_n$, $42_s$.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An optical temperature compensation system for spectral modulation sensors, comprising:
   a light director for receiving excitation light;
   a spectral modulation sensor for receiving and modulating a first portion of the excitation light from said light director; and
   an optical processing component for receiving and determining properties of a second portion of said excitation light from said light director and the modulated first portion of said excitation light, said optical processing component comprising:
   a dispersive element for dispersing said second portion of said excitation light and said modulated first portion of said excitation light; and
   a charge transfer device for converting the dispersed portions of light into electrical signals.

2. The system of claim 1, wherein said light director comprises a directional coupler.

3. The system of claim 2, further including a light source and wherein:
   said spectral modulation sensor comprises a reflective spectral modulation sensor; and
   said directional coupler optically couples said light source and a portion of said optical processing component to said spectral modulation sensor.

4. The system of claim 2, further including a light source and wherein said spectral modulation sensor comprises a transmissive spectral modulation sensor; and
   wherein said directional coupler optically couples said light source to a portion of said optical processing component and said spectral modulation sensor, and said spectral modulation sensor is further directly coupled to another portion of said optical processing component.

5. The system of claim 1, wherein said charge transfer device comprises a device selected from the group consisting of charge injection devices and charge coupled devices.

6. The system of claim 5, wherein said dispersive element comprises a device selected from the group consisting of a grating, prism, wavelength division multiplexer, common path interferometer, and spectrometer.

7. The system of claim 1, wherein said charge transfer device comprises a charge injection device, said system further including a plurality of shift registers for scanning said charge injection device.

8. An optical temperature compensation system for spectral modulation sensors, comprising:
   a plurality of spectral modulation sensors;
   a light director optically coupled to said plurality of spectral modulation sensors for receiving excitation light and for delivering respective sensor portions of the excitation light to said spectral modulation sensors; and an optical processing component for receiving modulated light from said plurality of spectral modulation sensors and for receiving a source portion of excitation light from said light director, said optical processing component comprising:
a dispersive element for dispersing said source portion of excitation light and said modulated light from said plurality of spectral modulation sensors; and
a charge transfer device for converting the dispersed portions of light into electrical signals.

9. The system of claim 8, wherein said light director comprises a star coupler.

10. The system of claim 8, wherein said dispersive element comprises a device selected from the group consisting of a grating, prism, wavelength division multiplexer, common path interferometer, and spectrometer.

11. The system of claim 8, further including a digital signal processor for evaluating said electrical signals.

12. The system of claim 8, wherein said charge transfer device comprises a plurality of devices selected from the group consisting of charge injection devices and charge coupled devices.

13. The system of claim 12, wherein said dispersive element comprises a plurality of wavelength division multiplexers, said system further including a plurality of fiber optic bundles, each respective fiber optic bundle being adapted to deliver multiplexed light from a respective one of said wavelength division multiplexers to said charge transfer device.

14. The system of claim 8, wherein said charge transfer device comprises a charge injection device, said system further including a plurality of shift registers for scanning said charge injection device.

15. An optical temperature compensation system for spectral modulation sensors, comprising:
means for splitting excitation light into first and second excitation portions;
means for spectrally modulating said first excitation portions;
means for dispersing the modulated first excitation portion and said second excitation portion;
means for converting the dispersed, modulated first excitation portion into a detection electrical signal and the dispersed second excitation portion into a source electrical signal; and
means optically coupled to said converting means for calculating a detected ratio of said source and detection electrical signals.

16. The system of claim 15, wherein said means for splitting excitation light comprises a directional coupler.

17. The system of claim 15, wherein said converting means comprises a device selected from the group consisting of charge injection devices and charge coupled devices.

18. The system of claim 17, wherein said dispersing means comprises a device selected from the group consisting of a grating, prism, wavelength division multiplexer, common path interferometer, and spectrometer.

19. A method of optical temperature compensation for spectral modulation sensors, comprising the steps of:
splitting excitation light into two excitation portions;
spectrally modulating one of said two excitation portions of said excitation light;
dispersing the modulated portion of said excitation light;
converting the dispersed, modulated portion of said excitation light into detection electrical signals;
dispersing the second excitation portion of said excitation light;
converting the dispersed second excitation portion of said excitation light into a source electrical signal; and
calculating a detected ratio of said source and detection electrical signals.

* * * * *